Dec. 15, 1931.  R. McKNIGHT  1,836,721
ELECTRICAL FURNACE
Filed Oct. 8, 1929  3 Sheets-Sheet 1

INVENTOR.
Robert McKnight,
BY
Geo. F. Kimmel.
ATTORNEY.

Dec. 15, 1931.  R. McKNIGHT  1,836,721
ELECTRICAL FURNACE
Filed Oct. 8, 1929  3 Sheets-Sheet 2

INVENTOR.
Robert McKnight,
BY
Geo. P. Kimmel
ATTORNEY.

Dec. 15, 1931.　　　R. McKNIGHT　　　1,836,721
ELECTRICAL FURNACE
Filed Oct. 8, 1929　　3 Sheets-Sheet 3

INVENTOR.
Robert M. Knight,
BY
Geo. P. Kimmel.
ATTORNEY.

Patented Dec. 15, 1931

1,836,721

UNITED STATES PATENT OFFICE

ROBERT McKNIGHT, OF PITTSBURGH, PENNSYLVANIA

ELECTRICAL FURNACE

Application filed October 8, 1929. Serial No. 398,217.

This invention relates to an electrical furnace for reducing ores and metallic compounds into metals, and has for its primary object to provide, in a manner as hereinafter set forth, to reduce the ore or metallic compound in a manner whereby the resultant metal will be free of slag.

A further object of the invention is to provide, in a manner as hereinafter set forth for the freeing of any metal that may be reduced that is contained in the gangue matter or slag.

A further object of the invention is to provide, in a manner as hereinafter set forth for the discharge of the metal from the bottom of a reducing chamber and with the metal being free of slag.

A further object of the invention is to provide, in a manner as hereinafter set forth for the removal from the material being treated gangue matter during the travel of the material.

A further object of the invention is to provide, in a manner as hereinafter set forth for successively submitting, at different levels, the material to reducing temperatures during the continuous travel of the material while being treated, and subsequently to each reducing step dropping the material from a higher to a lower level to assist in throwing off the gases and further for freeing any metal which might be reduced that is contained in the slag.

A further object of the invention is to provide, in a manner as hereinafter set forth, a series of reducing chambers arranged in steplike form at different levels to provide a drop for the material when discharged from one reducing chamber into another, communicating means between the reducing chambers, gas lead-off pipes for the reducing chambers and a common discharge pipe for said gas lead-off pipes.

A further object of the invention is to provide, in a manner as hereinafter set forth, a series of spaced reducing chambers progressively arranged at different levels from front to rear, and with each chamber having means for the discharge of slag during the travel of the material therethrough.

Further objects of the invention are to provide, in a manner as hereinafter set forth, an apparatus for the purpose referred to which is simple in its construction and arrangement, strong, durable, compact, thoroughly efficient in its use, readily assembled, and comparatively inexpensive to operate for the purpose intended.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1:
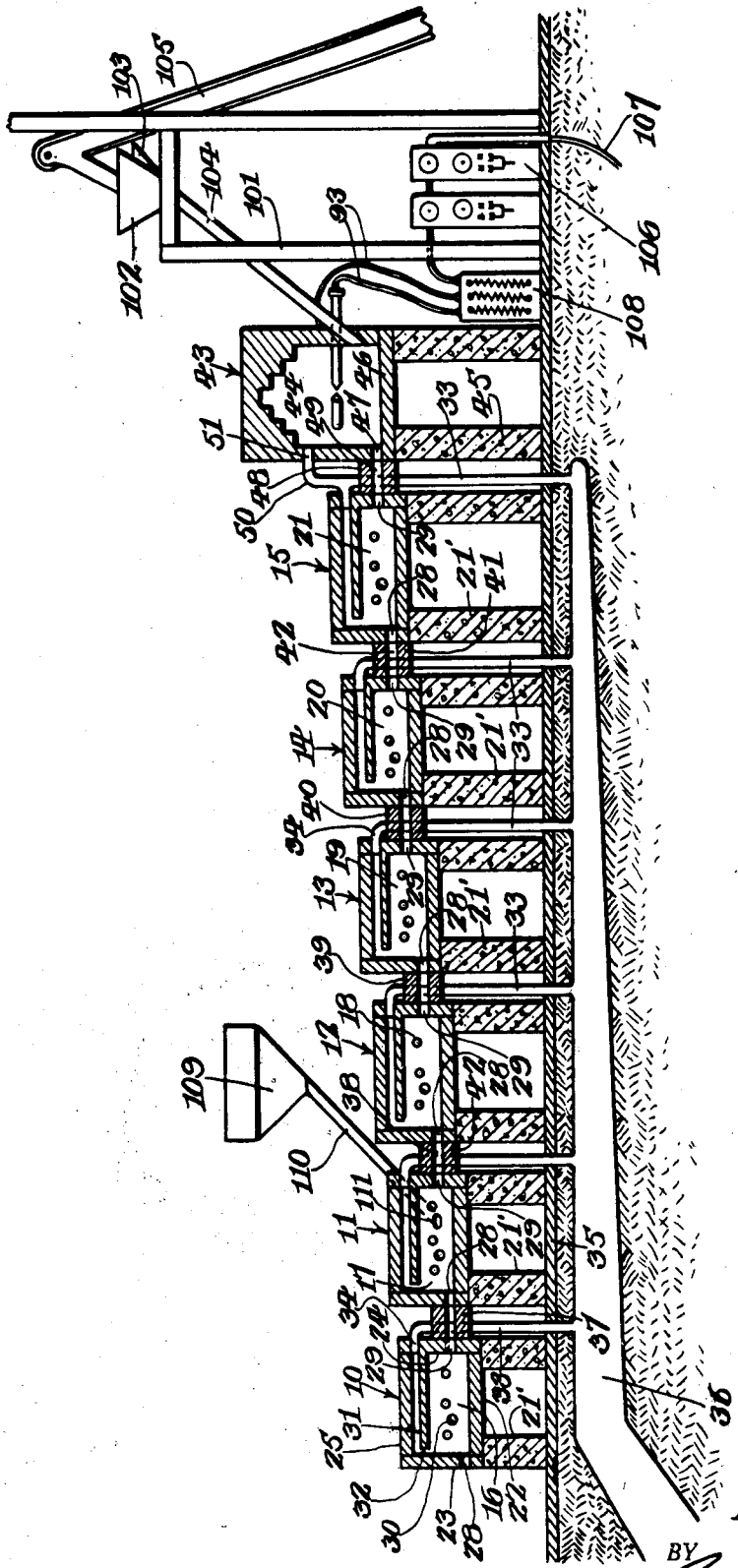
Figure 1 is a longitudinal sectional view of an electrical furnace for reducing ores and metal compounds into metal.

The furnace may be set up with as many reduction elements or units as desired, the units however progressively increase in height from the discharge end to the intake end of the furnace. As illustrated the apparatus is shown as including a set of six reduction units designated generally at 10, 11, 12, 13, 14 and 15, and which provide the reduction chambers 16, 17, 18, 19, 20 and 21 respectively.

As the reduction units are of the same construction, but one will be described, as the description of one will apply to the other. Each reduction unit includes a base 21'. The base of each inner unit is of greater height than the base of each outer unit. Arranged on the base 21 is a super-structure which provides the reducing chamber and consists of a bottom 22, a front wall 23, a rear wall 24, a top wall 25 and a pair of side walls 26, 27. The inner face of the super-structure is such as to provide the reducing chamber of cylindrical cross section. See Figure 4.

The front wall 23 is formed with a discharge port 28 having the lower portion of the wall thereof flush with the upper face of the bottom 22 of the reducing chamber. The rear wall 24 is provided with an intake port 29 which is arranged at a higher level than the discharge port 28. Tap openings for the slag may be provided in the side walls 26, 27, but preferably in wall 26, which opening is indicated at 30 in wall 26 and arranged at the level of the intake port 29.

The top wall 25 is formed with a flue 31 for carrying off the gases from the reducing chamber. The flue 31 extends lengthwise of the top wall 25, opens at its front end, as at 32 into the reducing chamber in proximity to the front wall 23, and at its rear end communicates with a depending gas conducting pipe 33 which is anchored at its upper end, as at 34 in the upper part of the rear wall 24. The pipe 33 is arranged at the rear of the unit, extends down through the foundation 35 which is common to the several units and opens into a gas discharge pipe 36 which is common to the said several gas conducting pipes 33.

The intake ports are positioned relatively to the bottoms of the reducing chambers preferably at a distance whereby the material will have a drop of twelve inches when discharged from a rear reducing chamber into a forward one.

The discharge port 28 of a rear reducing chamber is arranged in alignment with the intake port 29 of a forward reducing chamber.

Interposed between the units 10 and 11, units 11 and 12, units 12 and 13, units 13 and 14, units 14 and 15 and units 15 and 16 are tubular members 37, 38, 39, 40 and 41 respectively. Each tubular member has its inner face registering with a discharge port and an intake port. Each tubular member establishes communication between the reducing chamber of a rear unit with the reducing chamber of a forward unit. Each tubular member provides a material conducting channel 42. Each forward tubular member is arranged below each rear tubular member.

Arranged rearwardly of the reduction unit 15 is a melting unit 43 providing a preliminary melting chamber 44 for the material to be acted upon. The chamber 44 is of cylindrical contour in sectional plan. The unit 43 includes a base 45 of greater height than the base 21' of unit 15. The bottom 46 of chamber 44 is arranged above the bottom 22 of chamber 21. A discharge port 47 is provided for a chamber 44 and which is positioned in alignment with the intake port 29 of chamber 21. Arranged between the units 15 and 43 is a tubular member 48 which registers with the intake port 29 of chamber 21 and discharge port 47 of chamber 44. The member 48 establishes communication between chambers 21 and 44 and provides a passage 49 for the material.

The gas conducting pipe 33 for chamber 21, is formed at its top with an upstanding, angle-shaped branch 50, which opens into the upper portion of the chamber 44, as at 51. The bottoms of chambers 16 to 21 inclusive and chamber 14 incline downwardly from rear to front and the tubular members incline in a like direction, and which facilitates the travel of the material being treated from the melting chamber to the inner reducing chamber and from one reducing chamber at the rear to a reducing chamber at the front.

Figure 3:
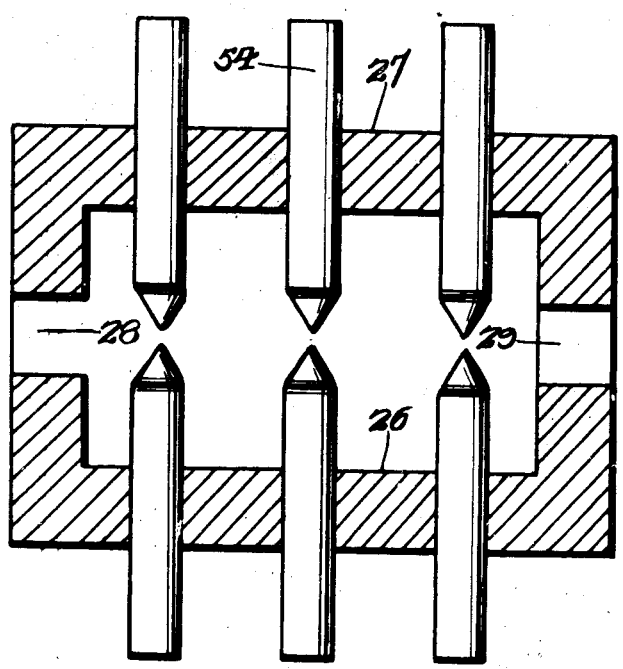
Figure 3 is a sectional plan illustrating the form of reducing chamber.
Figure 4:
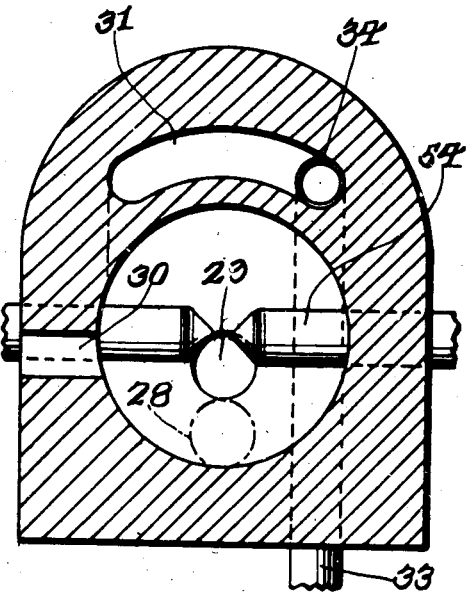
Figure 4 is a vertical sectional view illustrating the form of reducing chamber.
Figure 5:
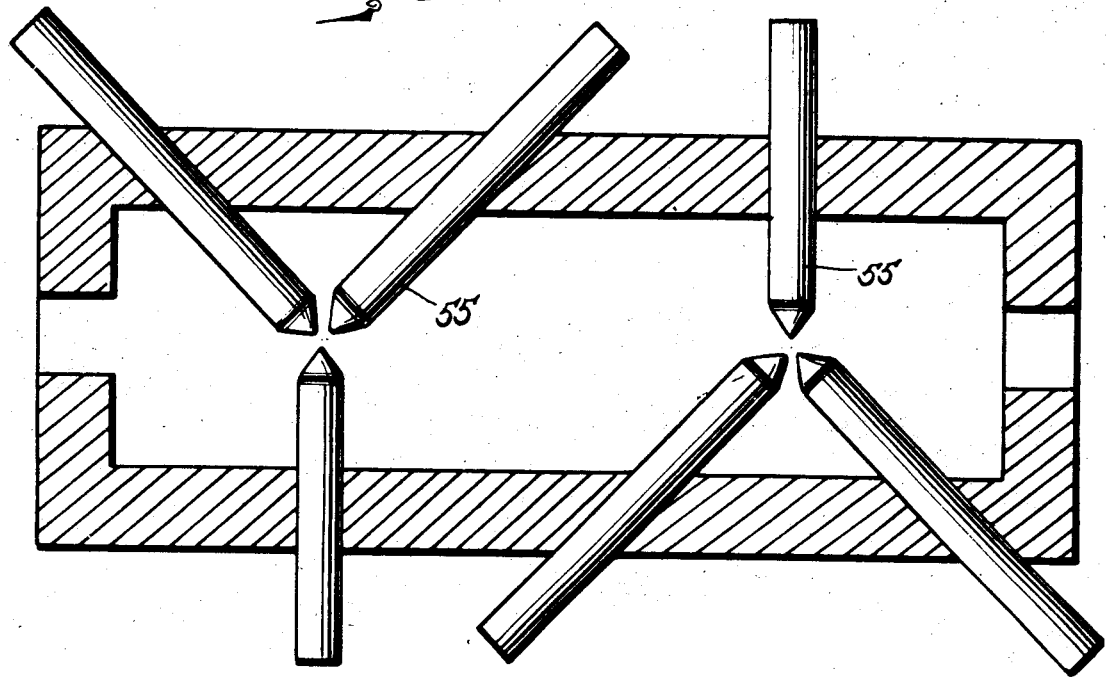
Figures 5 and 6 are respectively a sectional plan and a cross section of the reducing chamber showing a modified form of electrode arrangement.
Figure 6:
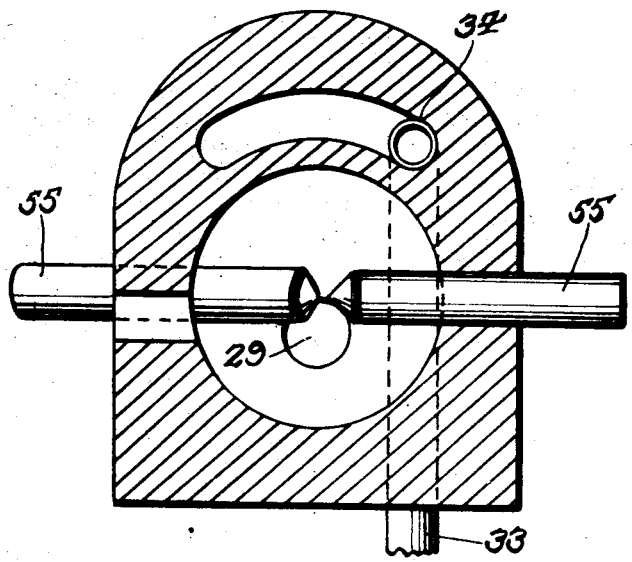

Associated with each of the reducing chambers 16 to 21 is a series of heating elements to provide the reducing temperatures. Such temperature may be uniform in each chamber or otherwise, that is to say, each reducing chamber heated separate at a uniform heat or at different heats if desired. The heating elements are in the form of electrodes, which may be arranged as shown in Figures 3 and 4 or in the manner as illustrated in Figures 5 and 6. The melting chamber has associated therewith a series of electrodes and which are arranged in the formation as shown.

Figure 2:
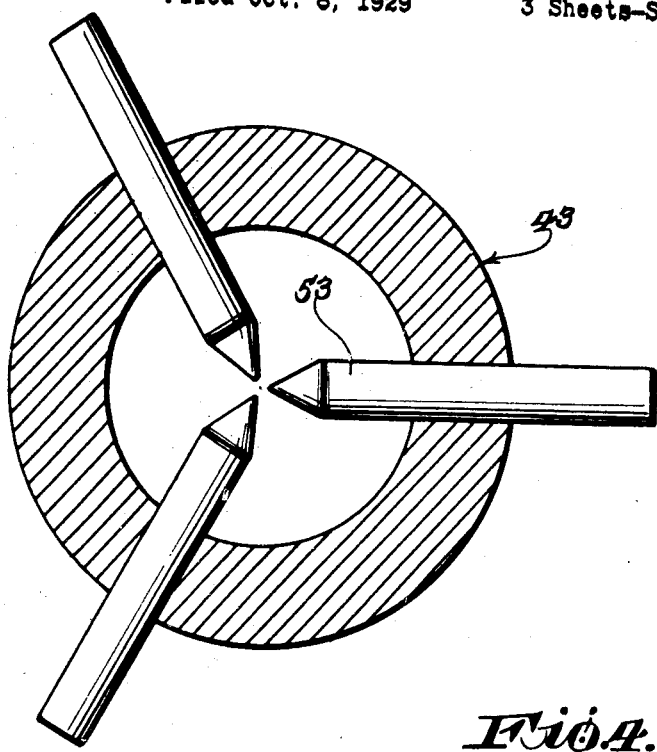
Figure 2 is a sectional plan of an element or unit of furnace providing a melting chamber.

In Figure 2 the electrodes are indicated at 53, Figures 3 and 4 at 54 and in Figures 5 and 6 at 55.

A supporting structure 101 is arranged adjacent the unit 42 and is of greater height than the height of such unit. Mounted on the structure 101 is an ore hopper 102 and a catalyst hopper 103. Leading from the hopper 102 and discharging into the chamber 44 is an ore chute 104. Leading from a source of supply, not shown, is an upstanding conveyor 105 for discharging the material to be treated in the hopper 102.

Positioned within the support 101 is a switch board 106 having attached thereto circuit connections 107 which lead from a source of electrical energy, not shown. Electrically connected with switch board 106 is a transformer 108 from which extends circuit connections 93 for the electrodes.

The apparatus is provided with means for supplying an alloy to a reducing chamber and by way of example such means is illustrated in connection with unit 11. The means consists of an alloy hopper 109, having a discharge chute 110 which opens at 111 into the reducing chamber provided by unit 11.

The material to be treated is first supplied to the unit 43 and initially melted, after which it is successively treated in units 15, 14, 13, 12, 11 and 10. As the material being treated is travelling through the units 10 to 15 both inclusive, the major portion of the slag will pass out of the tap holes 30, but the remaining portion will fall with the material when supplied from an inner to an outer unit. The material being treated when supplied to a forward unit has a fall or drop of preferably twelve inches which assists in throwing off the gases and freeing any material that might be reduced that is contained in the slag passing from a rear unit to a forward unit, as when the material drops it opens up the slag and allows the gases to escape and the separation of any reduced material from the slag which is carried by the latter.

The material when passing from a rear unit to a forward unit discharges at the bottom of a rear unit and is supplied into the forward unit a substantial distance above the bottom of the latter, or in other words, the metal is tapped from the bottom of the rear reducing chamber and supplied into a forward reducing chamber above the bottom of the latter. The travel of the material from the unit 43 to the unit 10 is by gravity, and the travel thereof is greatly facilitated, due to the inclination of the bottoms of the chambers downwardly from rear to front, and such inclined arrangement is also had with respect to the tubular communicating members which are interposed between the units.

The heat employed with respect to the reducing chambers can be as desired, as the heats may be uniform for the several chambers or at different temperatures. Any suitable source of heat may be used, electrical preferred.

What I claim is:

1. In an apparatus for the purpose set forth a plurality of spaced reduction units for the continuous travel therethrough of the material being treated, each of said units providing a reducing chamber, means for discharging the material at the bottom of a rear chamber and for supplying it into a forward chamber above the bottom of the latter, electrical heating means extending into each of said chambers, and each of said units provided with a gas outlet flue and a discharge outlet for slag.

2. In an apparatus for the purpose set forth a plurality of spaced reduction units for the continuous travel therethrough of the material being treated, each of said units providing a reducing chamber, means for discharging the material at the bottom of a rear chamber and for supplying it into a forward chamber above the bottom of the latter, electrical heating means extending into each of said chambers, each of said units provided with a gas outlet flue and a discharge outlet for slag, and a gas discharge means common to the said gas outlet flues.

3. In an apparatus for the purpose set forth, a plurality of spaced reduction units for the continuous travel therethrough of the material being treated, each of said units providing a reducing chamber, means for discharging the material at the bottom of a rear chamber and for supplying it into a forward chamber above the bottom of the latter, electrical heating means extending into each of said chambers, each of said units provided with a gas outlet flue and a discharge outlet for slag, the bottom of each of said reducing chambers inclining downwardly from rear to front, and means for discharging the material from one unit and supplying it into another unit inclining downwardly from front to rear.

In testimony whereof, I affix my signature hereto.

ROBERT McKNIGHT.